United States Patent Office 3,353,010
Patented Nov. 14, 1967

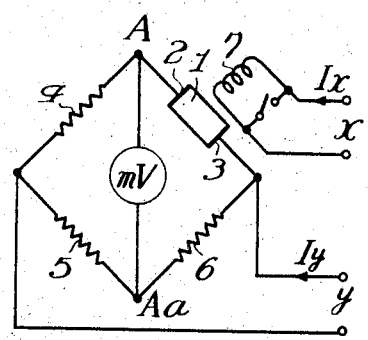
Fig-7-
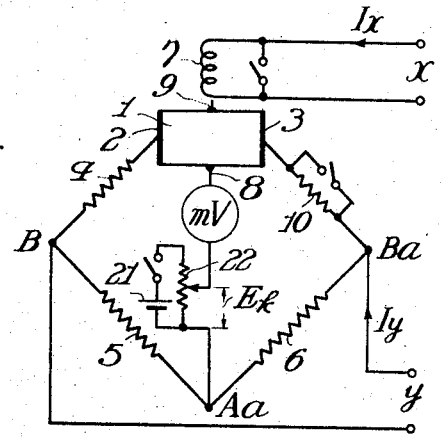
Fig-8-
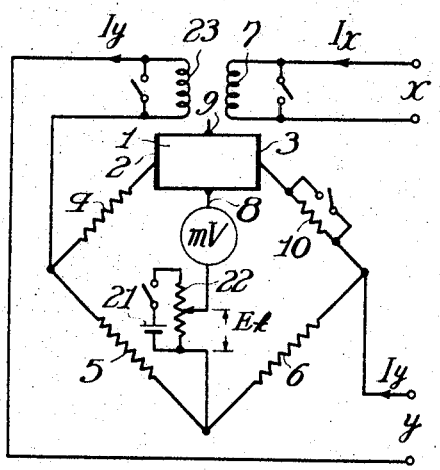
Fig-9-
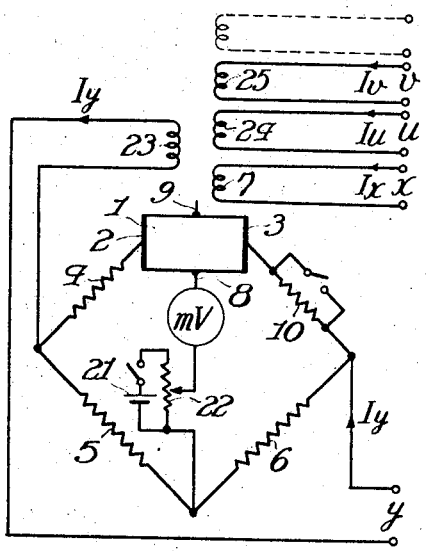
Fig-10-

3,353,010
ANALOG COMPUTERS UTILIZING GEOMETRICAL MAGNETORESISTANCE EFFECT OF HIGH MOBILITY SEMICONDUCTORS
Shoei Kataoka, Kitatama-gun, Tokyo-to, Hideo Yamada, Meguro-ku, Tokyo-to, and Shintaro Kobayashi, Setagaya-ku, Tokyo-to, Japan, assignors to Agency of Industrial Science and Technology, Ministry of International Trade and Industry, Tokyo-to, Japan, an authority of the Japanese Government
Filed Mar. 25, 1963, Ser. No. 267,421
Claims priority, application Japan, Mar. 30, 1962, 37/12,024; June 30, 1962, 37/22,801; July 4, 1962, 37/27,514
11 Claims. (Cl. 235—179)

ABSTRACT OF THE DISCLOSURE

A magnetoresistive element and analog circuits constructed therewith. The element is an intermetallic semiconductor body having high electron mobility and magnetoresistivity which is resistance change under the effect of a magnetic field. The element is a rectangular body having two terminals for passing a current through the body. The terminals are disposed relative to the geometry of the semiconductor body so that the principal resistivity affecting said current is geometrical magnetoresistance comprising resistivity due to the deflection path of the current in response to the magnetic field.

The total resistivity of the semiconductor body comprises magnetoresistivity principally geometrical magnetoresistance so that a voltage across the two terminals is proportionate to a product of a multiplying action between the magnetic field and the current.

The element can be provided with Hall terminals so that voltage across these terminals is likewise proportional to a different product of a multiplying action between the magnetic field and the current passing through the element.

---

This invention relates to analog computers utilizing semiconductors and more particularly to a novel computer which can produce various algebraic functions by utilizing the geometrical magnetoresistance effect of semiconductors of high mobility.

In prior analog computers of various types including the electron tube type (voltage simulating type), magnetic amplifier type (current simulating type) and other like types, the individual calculating elements separately effect calculation, such as addition, multiplication and the like operations, and the results are then combined. Therefore, in order to operate on algebraic equations of high degree it is required to use a number of calculating elements. Thus, for example, where it is desired to solve an equation $y = ax^3 + bx^2 + cx$, at least eight elements (i.e., vacuum tubes) have been required corresponding to the equation $\{a(x \times x \times x) + b(x \times x)\} + cx$. In another example where it is desired to operate on an equation of more complicated form $$Z = \{a(x+by)^2 + c(x+by) + d\}y + k$$

it has been necessary to use at least seven adding devices and two multiplying devices in addition to several potentiometers for effecting fine adjustment and to provide constants. Thus, such prior analog computers are disadvantageous in that they have bulky sizes, are difficult to operate, and are accompanied by errors in each stage.

Likewise, in order to produce a square of a trigonometric function by utilizing a conventional analog computer, a number of linear elements have been combined to provide trigonometric functions, and then these functions have been multiplied with a multiplying device.

Accordingly, it is the principal object of this invention to provide a novel analog computer which is simple and easy to operate.

According to the basic principle of this invention, the geometrical magnetoresistance effect of a semiconductor is utilized in complicated calculations, more particularly, in solving algebraic equations up to the third degree including a number of variables, and a single semiconductor element of high mobility is used to utilize the geometrical magnetoresistance effect and Hall effect coexisting in the semiconductor. Generally, when a semiconductor having high mobility is placed in a magnetic field, its resistance will increase in proportion to the square of the magnetic field in the range of relatively weak magnetic field. On the other hand, if an electric current is passed through a semiconductor placed in a magnetic field, due to the Hall effect, a voltage which is proportional to the product of the current and the magnetic field will be created in a direction perpendicular to the direction of voltage application to the semiconductor. According to one embodiment of this invention, the exciting coil of an electromagnet for producing said magnetic field is connected in series with the semiconductor and a current is passed in series through the exciting coil and the semiconductor. With such an arrangement, a voltage variation proportional to the third power of the current will be produced across the current terminals of the semiconductor owing to the geometrical magnetoresistance effect, while a voltage proportional to the square of the current will be produced across the Hall terminals of the semiconductor owing to the Hall effect. These voltages are suitably combined to effect analog operation of algebraic equations of the third degree. In accordance with a further embodiment of this invention the semiconductor and the exciting coil of an electromagnet for applying magnetic field to the semiconductor are energized by separate currents. Then, the voltage appearing across the current terminals of the semiconductor will vary in proportion to the product of the square of the exciting current and current through the semiconductor, whereas across the Hall terminals there will be produced a voltage which is proportional to the product of the exciting current and the semiconductor current. Again, these voltages are suitably combined to effect analog operation of algebraic equations up to the third degree containing many variables.

In a still further modification of this invention, a very thin resistance element made of a semiconductor material having high mobility is mounted to be rotatable in a constant magnetic field which may be unidirectional or alternating to cause the resistance of the element to vary under the influence of the magnetic field, and such resistance variation is utilized to effect analog calculation of terms such as $\cos^2 \theta$, $\sin^2 \theta$, and the like.

The features of the invention which are believed to be novel are set forth with particularity in the appended claims. The invention, however, as to its organization together with further objects and advantages thereof, may best be understood by reference to the following description taken in connection with the accompanying drawings, in which;

FIG. 1 schematically illustrates an embodiment of this invention to effect analog operation of an equation $y = ax^3$ by utilizing magnetoresistance effect;

FIG. 7 shows an example of an analog computer utilizing the magnetoresistance effect for calculating an equation $Z=ax^2y$;

FIG. 8 shows an analog computer for calculating an equation $Z=(ax^2+bx+c)y+d$ by utilizing the combination of the magnetoresistance and the Hall effects;

FIG. 9 shows another analog computer for calculating an equation $Z=\{a(x+by)^2+c(x+by)+d\}y+k$ by utilizing the same principle as in FIG. 2;

FIG. 10 shows another embodiment of the analog computer adapted to calculate an equation $$Z=\{A(x+ay+bu+cv+\ldots)^2 + B(x+ay+bu+cv+\ldots)+K\}y+k$$

Figure 1:
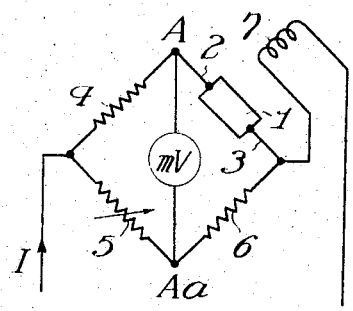

Referring now to the accompanying drawing, FIG. 1 shows an analog computer adapted to calculate an equation $y=ax^3$ by utilizing the magnetoresistance effect of a semiconductor material. As shown in this figure, a magnetoresistance element comprising an element 1 of a semiconductor having high mobility (for example InAs, InSb and the like) and provided with current terminals 2 and 3 is connected in a bridge circuit together with resistors 4, 5 and 6 and the semiconductor element 1 is connected in series with exciting coil 7 of an electromagnet which applies a magnetic field to the semiconductor element 1. First, the values of the respective resistors are adjusted so as not to generate a voltage across the output terminals A and A$a$ when a current I is passed through the bridge with the terminals of the exciting coil 7 short circuited, thus producing no magnetic field. Then, the short circuit around the exciting coil 7 is opened to cause the current I to flow serially through the bridge and the exciting coil, thus producing an output voltage $m$V across the terminals A and A$a$ proportional to $I^3$. Thus, it will be seen that this circuit constitutes an analog computer for $ax^3$.

Figure 2:
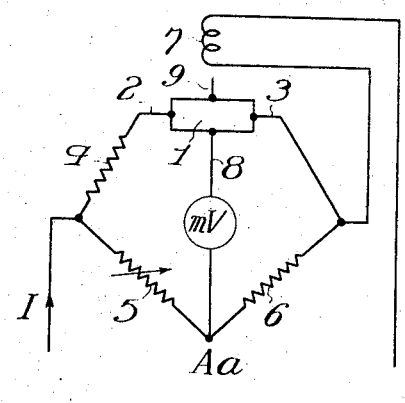
FIG. 2 shows a similar circuit for effecting analog operation of an equation $y = ax^3 + bx^2$ by utilizing both magnetoresistance effect and the Hall effect.

FIG. 2 illustrates an analog computer suitable for calculating an equation $y=ax^3+bx^2$ by utilizing the combination of magnetoresistance effect and the Hall effect. In this embodiment, the semiconductor element 1 is provided with a pair of Hall terminals in addition to the current terminals 2 and 3. The semiconductor element 1 is connected across the input terminals of the bridge circuit in series with the resistor 4, and the output of the bridge is derived from between the terminal 8 and the terminal A$a$; again, the exciting coil 7 is connected in series with the bridge and, hence, with the semiconductor element 1. By suitably adjusting the value of resistors 4, 5 and 6 in the same manner as described above in connection with FIG. 1, an output corresponding to the sum of $I^2$ and $I^3$ can be obtained, thereby providing an analog computer capable of calculating an equation $ax^3+bx^2$. If the other Hall terminal 9 is substituted for the terminal 8, the sign of the coefficient of $x^2$ will be reversed, thus enabling analog calculation of $ax^3-bx^2$.

Figure 3:
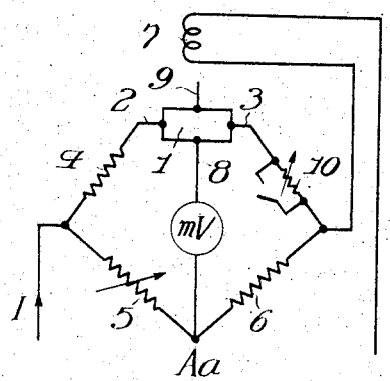
FIG. 3 shows another analog computer for solving an equation $y = ax^3 + bx^2 + cx$ by utilizing the same principle as in FIG. 2.

In the embodiment shown in FIG. 3, a resistor 10 of relatively small value is inserted in series with one of the current terminals 3 of the semiconductor element 1. Other components of FIG. 3 are connected in the same manner as in FIG. 2. First, the bridge is balanced by short circuiting the resistor 10, and then the short circuit around the resistor 10 is opened to pass current I through the bridge and the exciting coil which is connected in series. Thus, a voltage proportional to the current I will also be included in the output, thereby enabling analog calculation of the equation $y=ax^3+bx^2+cx$. In this regard the coefficients $a$, $b$ and $c$ may be arbitrarily determined as follows: the values of $a$ and $b$ (strictly speaking, the ratio $a/b$) can be varied over a wide range by connecting as the load, a resistance of appropriate value across the Hall terminals 8 and 9, whereas the coefficient $c$ can be varied easily by adjusting the value of the resistor 10. The sign of the respective coefficients can be made either plus or minus depending upon the direction of current, the Hall terminal selected, and the position of insertion of the resistor 10 (in the left or right arm of the bridge).

Figure 4:
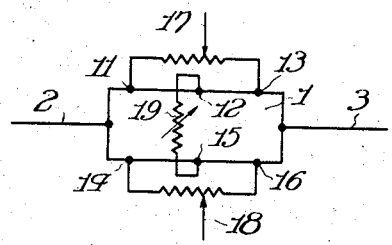
FIG. 4 shows the structure of an improved analog element.

FIG. 4 illustrates an example of an analog element belonging to a higher class than those described in the above mentioned embodiments. Particularly, the analog element shown in FIG. 4 comprises a semiconductor element 1 provided with six Hall terminals 11, 12, 13, 14, 15, and 16 in addition to the current terminals 2 and 3. Opposite terminal pairs 11, 13, and 14 and 16 on the same sides are respectively interconnected by resistors having sufficiently high resistance as compared with that of the semiconductor element 1, output terminals 17 and 18 being derived from any suitable points along said shunt resistors. The Hall terminals 12 and 15 at the central region of the semiconductor element are interconnected through a variable resistance 19.

Figure 5:
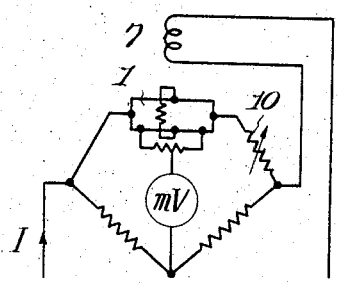
FIG. 5 illustrates one example of the application of the improved analog element shown in FIG. 4.

FIG. 5 shows one example of the analog computer of this invention including a bridge circuit having the improved analog element shown in FIG. 4. This circuit also acts as an analog computer for the equation $$y=ax^3+bx^2+cx$$

Thus, the magnitude and the sign of the coefficient $a$ can be adjusted at will by changing the position of the output terminal 18. On the other hand, the sign of the coefficient $b$ is determined according to whether the output is derived from the terminal 18 or terminal 17, and the magnitude of the coefficient $b$ can be varied at will by adjusting the resistance 19. Similarly, the magnitude as well as the sign of the coefficient $c$ can be determined in the manner already explained.

Figure 6:
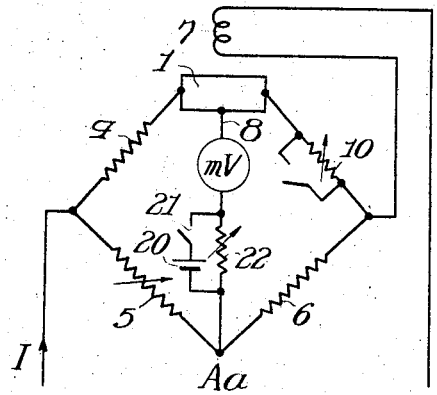
FIG. 6 shows an analog computer for calculating an equation $y=ax^3+bx^2+cx+d$.

Referring now to FIG. 6, there is shown a further modification of the analog computer adapted to calculate a third degree algebraic equation of the general form $y=ax^3+bx^2+cx+d$. The connection of FIG. 6 is generally identical to that shown in FIG. 3 except that a resistor 22 which is connected in parallel with a series combination of an auxiliary battery 20 and a switch 21 is connected in series with the output circuit of the bridge. The bridge is balanced by opening the switch 21, and then the switch is closed to obtain an output having an addition of a constant output, namely $d$, which is proportional to the value of the variable resistance 22.

The embodiments shown in FIGS. 7 to 10 inclusive are different from those shown in FIGS. 1 to 6 inclusive in that the semiconductor element 1 and its exciting coil 7 or coils are energized by separate currents in order to enable analog calculation of algebraic equations of more complicated form. As already pointed out hereinabove, by separate excitation, the voltage across the current terminals of the semiconductor element 1 will vary in proportion to the product of the square of the exciting current and the current flowing through the semi-conductor element, whereas a voltage will be produced across the Hall terminals which is proportional to the product of the exciting current and the current through the semiconductor element.

In the embodiment shown in FIG. 7 the bridge is supplied with a curent I$y$, while the exciting coil 7 is energized by a current I$x$. At first, the exciting coil 7 is short circuited, and the bridge is balanced to produce no voltage across its output terminals A and A′ by adjusting resistors 4, 5 and 6 while the current I$y$ is flowing. Then the short circuit of the exciting coil is opened, and the bridge and the exciting coil are supplied with currents I$y$ and I$x$, respectively to produce an output voltage $m$V across the output terminals A and A′ which is proportional to $I^2x \cdot Iy$. Thus, this circuit provides an analog computer for $ax^2y$.

In FIG. 8 is shown an analog computer utilizing the combined effect of the magnetoresistance and the Hall effects to calculate an equation $Z=(ax^2+bx+c)y+d$. The basic bridge construction of FIG. 8 is identical to that shown in FIG. 3 with the exception that a potentiometer resistance 22 is included in the output circuit of the bridge which is energized by an auxiliary source of supply such as a battery 21. First the exciting coil 7 and the resistor 10 are short circuited, and the battery 21 is disconnected from the potentiometer resistance 22. Thus, under the condition of zero magnetic field, zero resistance 10 and zero series-connected voltage of the output circuit, various resistors 4, 5 and 6 are adjusted until the output voltage of the bridge becomes zero in the same manner as has been explained in connection with FIG. 7. After opening the short circuits around the exciting coil and the resistor 10, the exciting current Ix and the bridge current Iy are passed. Then, across the terminals 2 and 8 and 3 and 8 are produced, respectively, a variable component of a voltage drop proportional to the product $I^2x \cdot Iy$ caused by the magnetoresistance effect and a resultant voltage difference of the Hall voltage proportional to the product $Ix \cdot Iy$. Inclusion of the resistance 10 will result in a voltage difference proportional to the current Iy across the terminals 3 and Ba. Accordingly, between the terminals 8 and Aa, there will appear a voltage difference expressed by the equation $$AI^2x \cdot Iy + BIx \cdot Iy + CIy = (AI^2x+BIx+c)Iy$$

corresponding to the combination of said difference potentials. When the series switch associated with the auxiliary battery 21 is closed at this instant, a contant voltage Ek provided by the potentiometer 22 will be added to the output, causing the output to become $$(AI^2x+BIx+c)Iy+Ek$$

Thus, it will be seen that this circuit provides an analog computer for the equation $(ax^2+bx+c)y+d$.

The modification shown in FIG. 9 is different from that shown in FIG. 8 in that it is provided with an additional exciting coil 23 which is connected in series with the bridge circuit to carry the same current Iy. In this embodiment, since the magnetic field acting upon the semiconductor element 1 is the sum of the fields produced by currents Ix and Iy, respectively, the output is the same as that of FIG. 8 except for the term containing the exciting current. Thus, the output in this case is expressed by an equation $$\{A(Ix+BIy)^2+C(Ix+BIy)+D\}Iy+Ek$$

Thus, it will be clear that the circuit shown in FIG. 9 provides an analog for an equation $$\{a(x+by)^2+c(x+by)+d+\}y+k$$

FIG. 10 illustrates a still further modification of this invention wherein a number of exciting coils 24, 25 . . . are added, which are separately energized by currents Iu, Iv, . . . , thereby providing an output expressed by $$\{A'(Ix+AIy+BIu+CIv+ \ldots)^2+B'(Ix$$
$$+AIy+BIu+CIv+ \ldots)+K\}Iy+k$$

Thus, this device permits analog calculation of an algebraic equation containing a number of variables of the general formula $$\{A+(x+ay+bu+cv+ \ldots)^2+B(x+ay$$
$$+bu+cv+ \ldots)+K\}y+k$$

The value of the various coefficients of the various analog computers shown in FIGS. 7 through 10, inclusive, can be determined by suitably adjusting the resistances in the various arms of the bridge, the amount of resistance inserted between the Hall terminals 8 and 9, and the shunt resistance (not shown) of the respective exciting coils, whereas the sign of the coefficients are determined by the direction of the currents flowing through the bridge and the respective exciting coils and the selected output terminals of the semiconductor element.

Figure 11:
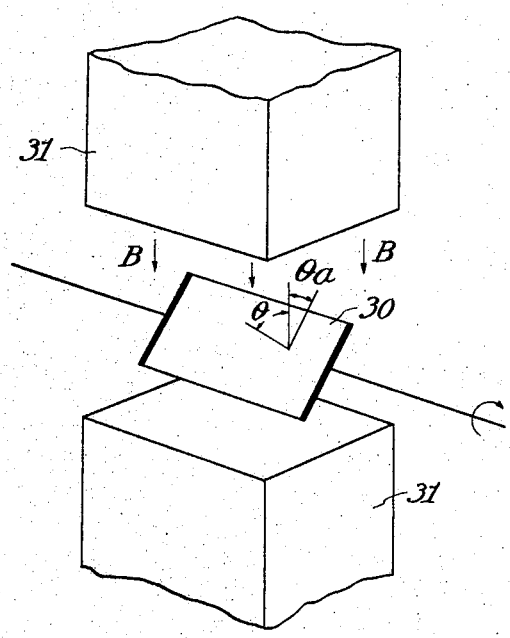
FIG. 11 shows the principle of this invention as applied to trigonometric functions.

The principle of the modification shown in FIG. 11 will now be considered. As stated hereinbefore, when a semiconductor having high mobility is subjected to a magnetic field, its electrical resistance increases in proportion to the square of the applied magnetic field. When a very thin wafer 30 of an intermetallic compound having two terminals is placed between the pole pieces of a direct current magnet or a permanent magnet 31, and if it is assumed that B denotes the flux density between pole pieces, $\theta$ an angle between the normal axis to the semiconductor wafer 30 and the direction of flux, then the flux density which is effective to provide the magneto-resistance effect of the semiconductor wafer 30 will be expressed by $B \cos \theta$. It is assumed that the electrical resistance of the semiconductor wafer 30 is represented by Rso when there is no magnetic field or when the semiconductor wafer is positioned in a place parallel to the magnetic field, then the resistance of the wafer will be represented by the following equation when the wafer is rotated to a position such that the angle between the normal axis and the magnetic flux is equal to $\theta$.

$$Rs=Rso\ (1-MB^2 \cos^2 \theta)$$

where M represents the magneto-resistance coefficient of the semiconductor wafer 30. Thus, if it is possible to obtain the increment of the electrical resistance, that is, $\Delta Rs=Rs-Rso$, then it can be shown that $\Delta Rs$ is proportional to $\cos^2 \theta$ provided that the flux density B is constant. In other words, it is possible to determine directly the square of a trigonometric function of an angle by rotating the semiconductor wafer 30.

If, instead of using said angle $\theta$, angle $\theta a$ between the plane of the semiconductor wafer and the direction of the magnetic flux were used, it would be possible to prove by the same principle that the increment in the electrical resistance of the semiconductor wafer is proportional to $\sin^2 \theta a$.

Figure 12:
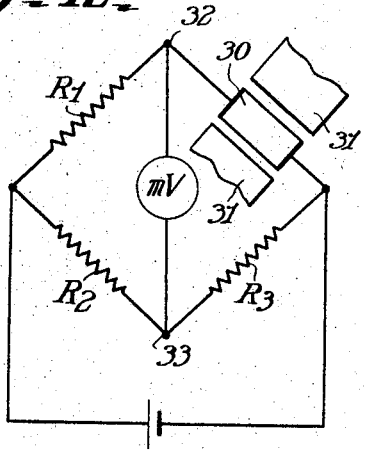
FIG. 12 is a schematic diagram of an analog computer according to the principle shown in FIG. 11.

FIG. 12 illustrates another embodiment of this invention utilizing the principle just described. As shown in this figure, the rotatable semiconductor wafer 30 is connected as one arm of an electric bridge together with three other resistors $R_1$, $R_2$ and $R_3$. It is to be understood that the wafer is suitably supported to rotate about an axis which lies in a direction perpendicular to the direction of the magnetic field established between pole pieces 31. The condition of the bridge is determined such that $$R_1R_3-R_2R_{so}$$

when $R_1 > R_s$. More specifically, the bridge is balanced so as not to produce any output voltage between its output terminals 32 and 33 when no magnetic field is applied to the semiconductor wafer or when the place of the wafer is aligned with the direction of the magnetic flux. When the wafer is rotated to a position such that its normal axis forms an angle $\theta$ with respect to the magnetic flux applied thereto an output proportional to $\cos^2 \theta$ is produced across the output terminals 32 and 33. On the other hand, if the angle $\theta$ is measured from a point 90° lagged from that of the former case, an ouptut proportional to $\sin^2 \theta$ can be obtained.

In order to accurately analog the value of $\cos^2 \theta$ or $\sin^2 \theta$ accurately by means of the analog computer of this invention, it is essential that the semiconductor wafer be extremely thin. It has been found that the accuracy of the computer increases with decrease in wafer thickness. For instance, if a rectangular semiconductor wafer is utilized, a thickness of less than 1/100 of the width of the wafer is generally preferable. This is because, with an insufficiently thin wafer, when the wafer is parallel to the flux or $\theta=90°$, some resistance variation may occur, thus causing error. Therefore, excellent results are obtained when the semiconductor wafer is formed by the vacuum deposition technique. The magnetic field may be alternating, provided that its intensity is substantially constant.

From the above description it will be understood that this invention provides a very simple analog computer for calculating algebraic equations up to third-degree equations containing a number of variables as well as trigonometric functions by utilizing a semiconductor material exhibiting magneto-resistance effect and Hall effect. The analog computer embodying the principle of this invention is accurate, reliable and easy to operate and to maintain, and has many advantages over prior analog computers. Thus, this invention is quite suitable for application to the calculating element in electronic analog computers, transmitting element in automatic controls, or telemeters, or wherever it is required to analog algebraic equations up to third-degree equations containing many variables.

While the invention has been explained by describing particular embodiments thereof, it will be apparent that further improvements and modifications may be made without departing from the scope of the invention as defined in the appended claims.

What is claimed is:

1. An analog circuit comprising a bridge circuit having an arm of said bridge circuit comprising a semiconductor element, said semiconductor element having geometrical magnetoresistance effect and high mobility, means to apply magnetic flux to said element and to vary the amount of magnetic flux acting upon said semiconductor element, and means connected to said circuit to derive an output potential from said circuit.

2. An analog circuit comprising a bridge circuit including a semiconductor element in one arm thereof having high mobility and geometrical magnetoresistance, an exciting coil to apply a magnetic field to said semiconductor, means connecting said bridge circuit in series with said exciting coil, and means comprising output terminals to derive from said circuit an output voltage corresponding to $ax^3$ where $a$ represents a coefficient, and $x$ a variable.

3. An analog circuit comprising a bridge circuit having in one arm a very thin semiconductor wafer having geometrical magnetoresistance and high mobility, means to apply a magnetic field across said semiconductor wafer, output means connected to said circuit, and means to rotate said semiconductor wafer with respect to said magnetic field thereby to derive an output voltage at said output means proportional to $\sin^2 \theta$ or $\cos^2 \theta$, where $\theta$ represents the angle of rotation of said semiconductor wafer.

4. An analog circuit comprising a semiconductor element of high mobility having geometrical magnetoresistance and a pair of current terminals and a pair of Hall terminals in said electric circuit, an exciting coil for applying a magnetic field to said semiconductor element, means connecting said exciting coil in series with said current terminals of said semiconductor, and means in said circuit to derive from one of said Hall terminals an output voltage proportional to $ax^3+bx^2$ and $ax^3-bx^2$, where $a$ and $b$ represent coefficients, and $x$ is a variable.

5. An analog computer according to claim 4, including resistance means in series with said current terminals of said semiconductor cooperative with said semiconductor to cause said circuit to have an output voltage proportional to $ax^3+bx^2+cx$, where $a$, $b$ and $c$ represent coefficients, and $x$ is a variable.

6. An analog circuit comprising a bridge circuit having an arm comprising a semiconductor element having geometrical magnetoresistance having high mobility, an exciting coil in said circuit to apply a magnetic field to said semiconductor, output terminals in said circuit, and means to apply separate energizing currents to said bridge circuit and said exciting coil thereby to obtain from said output terminals of said circuit an output voltage corresponding to $ax^2y$, where $a$ represents a coefficient, and $x$ and $y$ are variables.

7. An analog circuit comprising a bridge circuit having a semiconductor element of high mobility having geometrical magnetoresistance and a pair of current terminals and a pair of Hall terminals, at least one exciting coil to apply a magnetic flux to said semiconductor element, means to apply in operation separate energizing currents to said exciting coil and said bridge circuit, and means in said circuit to obtain from one of said Hall terminals an output voltage corresponding to a third-degree algebraic equation.

8. An analog circuit according to claim 7, including a plurality of other exciting coils to apply magnetic flux to said semiconductor element, connections connecting said one coil in series with said bridge circuit, and means to apply separate energizing currents to said other coils.

9. A magnetoresistance element comprising, a semiconductor body having magnetoresistivity corresponding to resistivity change under the effect of a magnetic field and high electron mobility, two terminals coactive with said semiconductor body for passing a current through said body and disposed relative to the geometry of said semiconductor body so that the principal resistivity affecting said current is geometrical magnetoresistance comprising resistivity due to the deflection path of said current in response to said magnetic field, the total resistivity of said semiconductor body comprising magnetoresistivity and principally geometrical magnetoresistance, whereby a voltage developed across said two terminals is a product of a multiplying action between said magnetic field and said current.

10. A magnetoresistive element according to claim 9, in which said semiconductor body is rectangular.

11. A magnetoresistive element according to claim 9, including Hall terminals.

References Cited

UNITED STATES PATENTS

| | | | |
|---|---|---|---|
| 2,649,569 | 8/1953 | Pearson | 307—88.5 |
| 3,162,805 | 12/1964 | Robertson | 338—32 |

OTHER REFERENCES

Hilsum, C.: Multiplication by Semiconductors, in Electronic Engineering, November 1958 (pgs. 664—666).

Millman, J.: Vacuum-Tube and Semiconductor Electronics, McGraw-Hill, New York, 1958 (pgs. 82—83).

Electronic Engineering, "An Electrical Multiplier Utilizing the Hall Effect in Indium Arsenide," by Chasmar and Cohen, November 1958.

MALCOLM A. MORRISON, *Primary Examiner.*

I. KESCHNER, A. J. SARLI, *Assistant Examiners.*